(12) United States Patent
Pravat et al.

(10) Patent No.: US 7,765,287 B2
(45) Date of Patent: Jul. 27, 2010

(54) PLATFORM MANAGEMENT TECHNIQUES OF HANDLING PROVIDERS

(75) Inventors: Daniel Pravat, Redmond, WA (US); RajeshDutta S Mishra, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 952 days.

(21) Appl. No.: 11/211,839

(22) Filed: Aug. 25, 2005

(65) Prior Publication Data

US 2007/0050487 A1 Mar. 1, 2007

(51) Int. Cl.
   G06F 15/173 (2006.01)
(52) U.S. Cl. ............... 709/223; 709/221; 709/230; 709/244
(58) Field of Classification Search ................. 709/223, 709/221, 230, 244
   See application file for complete search history.

(56) References Cited

U.S. PATENT DOCUMENTS

| | | | |
|---|---|---|---|
| 6,493,768 B1 * | 12/2002 | Boutcher | 719/330 |
| 6,742,006 B2 * | 5/2004 | Raduchel et al. | 707/200 |
| 6,971,090 B1 * | 11/2005 | Gruttadauria et al. | 717/136 |
| 7,478,388 B1 * | 1/2009 | Chen et al. | 718/1 |
| 7,512,774 B2 * | 3/2009 | Zarenin | 713/1 |
| 2003/0208573 A1 * | 11/2003 | Harrison et al. | 709/223 |
| 2004/0010576 A1 * | 1/2004 | Hyndman et al. | 709/223 |
| 2004/0043763 A1 * | 3/2004 | Minear et al. | 455/419 |
| 2004/0117338 A1 * | 6/2004 | Kennedy et al. | 707/1 |
| 2004/0148223 A1 * | 7/2004 | Ghaffar et al. | 705/14 |
| 2004/0221022 A1 * | 11/2004 | Gracyk | 709/220 |
| 2005/0114639 A1 * | 5/2005 | Zimmer | 712/244 |
| 2006/0101457 A1 * | 5/2006 | Zweifel et al. | 717/174 |
| 2006/0112369 A1 * | 5/2006 | Yu et al. | 717/100 |
| 2006/0265576 A1 * | 11/2006 | Davis et al. | 712/229 |
| 2006/0285692 A1 * | 12/2006 | Kerstens et al. | 380/270 |

* cited by examiner

*Primary Examiner*—Thu Nguyen
*Assistant Examiner*—Lan-Dai T Truong
(74) *Attorney, Agent, or Firm*—Lee & Hayes, PLLC

(57) ABSTRACT

Techniques described herein are directed toward side-by-side handling of providers on a 64-bit system. The request for loading a particular version of the provider may include a provider architecture flag that specifies a 32-bit or 64-bit version of a provider for managing the requested service. The request may also include a required architecture flag specifying that the given instantiation of the provider is required and to be forced. The platform manager loads a particular provider instantiation as a function of the provider architecture flag and the required architecture flag.

20 Claims, 4 Drawing Sheets

PLATFORM MANAGEMENT TECHNIQUES OF HANDLING PROVIDERS

BACKGROUND

The Windows® operating system includes the Windows Management Instrumentation (WMI) infrastructure that enables devices and systems in a network to be managed and controlled. More specifically, WMI allows a calling application to access operating system information, services and processes running on a given machine as well as on a remote machine on the network. WMI also allows the calling application to start and stop services, terminate processes and create new processes.

Providers are written for use by WMI to surface instrumented data and events for a particular managed entity on a system. The providers are loadable by the WMI subsystem upon request of calling applications. A loaded instantiation of a provider enables a particular service (e.g., managed object) to surface instrument data and events. Each managed entity instrumented via a WMI provider is compiled to a specific platform architecture (e.g., 32-bit host machine). For example, a 32-bit version of a provider is utilized to surface instrumented data and event of a 32-bit version of a service.

With the introduction of 64-bit platform architectures and 64-bit versions of the Windows operating system, a network may now contain both 32-bit and 64-bit machines. The 64-bit version of the Windows system will offer a 32-bit Windows-32-on-Windows-64 (e.g., WOW64) compatibility modes so as to enable 32-bit compiled programs to be run without requiring any modification.

SUMMARY

Techniques described herein are directed toward side-by-side handling of providers on a 64-bit system. The request for loading a particular version of the provider may include a provider architecture flag that specifies a 32-bit or 64-bit version of a provider for managing the requested service. The request may also include a required architecture flag specifying that the given instantiation of the provider is required and to be forced. The platform manager loads a particular provider instantiation as a function of the provider architecture flag and the required architecture flag.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

Embodiments are illustrated by way of example and not by way of limitation, in the figures of the accompanying drawings and in which like reference numerals refer to similar elements and in which.

DETAILED DESCRIPTION OF THE INVENTION

Techniques are described herein for handling providers in a system management component. The techniques include a transport mechanism for invoking a particular instantiation of a provider. The transport mechanism includes a provider architecture flag, for specifying a desired version of a provider, and an optional required architecture flag, for specifying that a given instantiation of the provider is required. The provider architecture flag and optionally the required architecture flag of the transport mechanism enable cross invoking of 32-bit services on a 64-bit host server.

Figure 1:
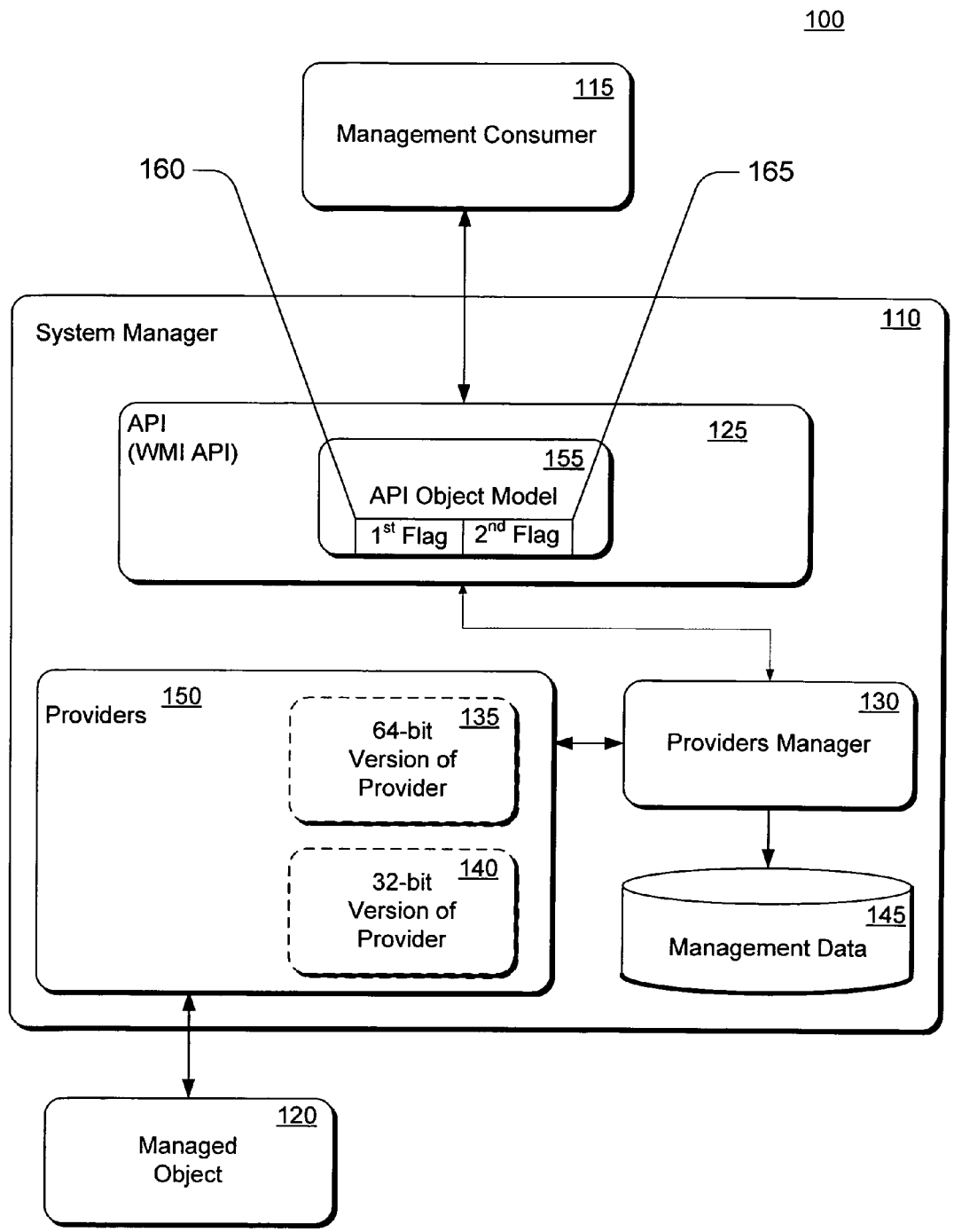
FIG. 1 shows a block diagram of an exemplary platform management environment.

FIG. 1 shows an exemplary platform management environment 100 for handling providers. The platform management environment 100 includes a system manager 110 communicatively coupled between a management consumer 115 and a managed object 120. The managed object 120 can be a hardware device, driver, a software application or other system components. The management consumer 115 may be a local or remote client application. The system manager 110 is a mediator that provides an application with the ability to configure and/or monitor events concerning hardware devices, code and data (e.g., drivers) and other applications. For example, the system manager 110 enables managed objects 120 to surface platform data and events to the management consumer 115.

Figure 2:
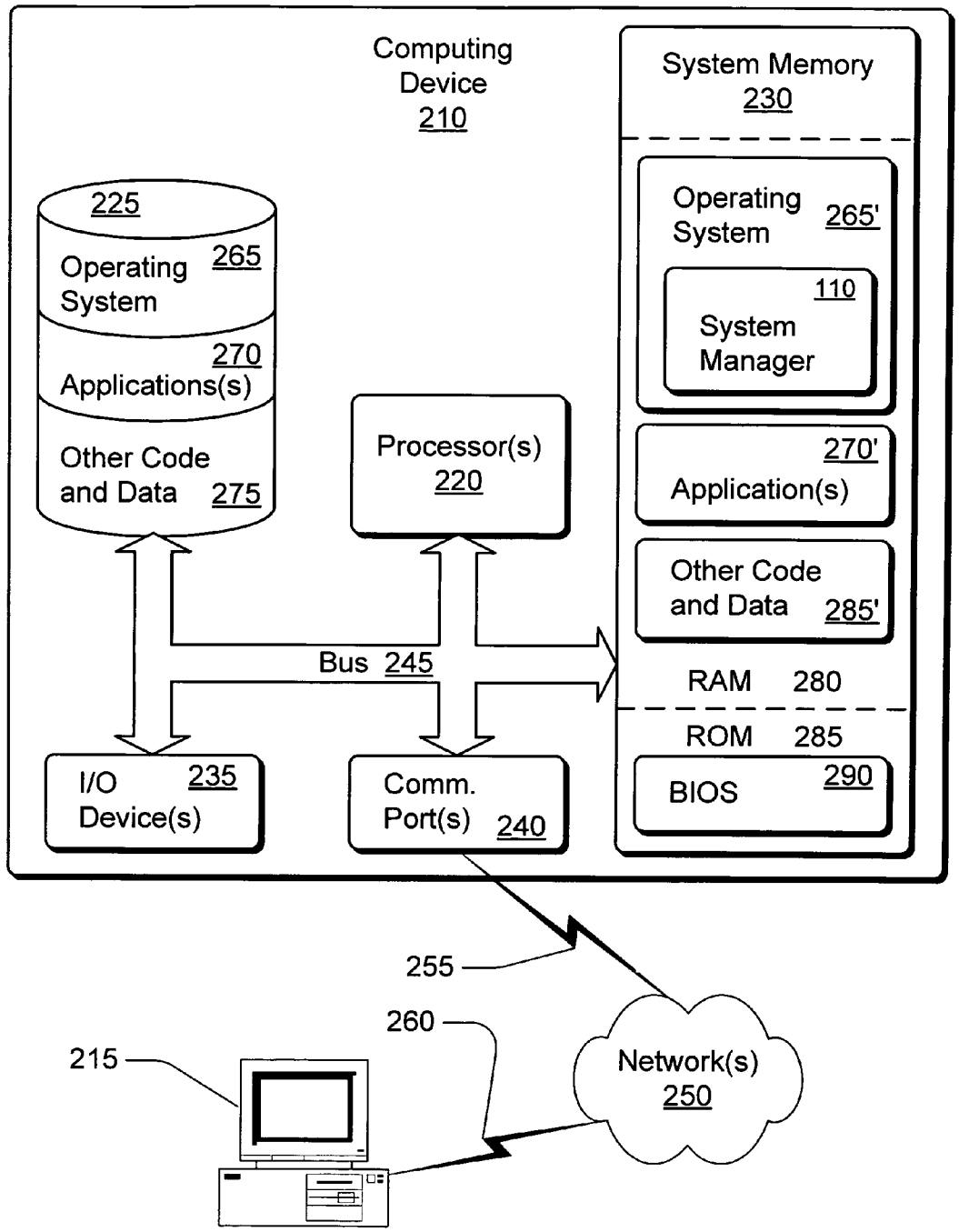
FIG. 2 shows a block diagram of an exemplary computing system for implementing the platform management environment.

FIG. 2 shows an exemplary computing system 200 for implementing the platform management environment 100. The computing system 200 includes a plurality of computing devices 210, 215 communicatively coupled to each other. Each computing device 210 may include one or more processors 220, one or more computer-readable media 225, 230 and one or more input/output devices 235, 240. The computer-readable media 225, 230 and input/output devices 235, 240 may be communicatively coupled to the one or more processors 220 by one or more buses 245. The one or more buses 245 may be implemented using any kind of bus architectures or combination of bus architectures, including a system bus, a memory bus or memory controller, a peripheral bus, an accelerated graphics port and/or the like.

The input/output devices 235, 240 may include one or more communication ports 240 for communicatively coupling the computing device 210 to one or more other computing devices 215. The one or more other devices 215 may be directly coupled to one or more of the communication ports 240 of the computing device 210. In addition, the one or more other devices 215 may be indirectly coupled through a network 250 to one or more of the communication ports 240 of the computing device 210. The networks 250 may include an intranet, an extranet, the Internet, a wide-area network (WAN), a local area network (LAN), and/or the like. The communication ports 240 of the computing device 210 may include any type of interface, such as a network adapter, modem, radio transceiver, or the like. The communication ports 240 may implement any connectivity strategies, such as broadband connectivity, modem connectivity, digital subscriber link (DSL) connectivity, wireless connectivity or the like.

The computing device 210 may also include additional input/output devices 235 such as one or more display devices, keyboards, and pointing devices (e.g., a "mouse"). The input/output devices 235 may further include one or more speakers, microphones, printers, joysticks, game pads, satellite dishes, scanners, card reading devices, digital cameras, video cameras or the like. The input/output devices 235 may be coupled to the bus 245 through any kind of input/output interface and bus structures, such as a parallel port, serial port, game port, universal serial bus (USB) port, video adapter or the like.

The computer-readable media 225, 230 may include system memory 230 and one or more mass storage devices 225. The mass storage devices 225 may include a variety of types of volatile and non-volatile media, each of which can be removable or non-removable. For example, the mass storage devices 225 may include a hard disk drive for reading from and writing to non-removable, non-volatile magnetic media. The one or more mass storage devices 225 may also include a magnetic disk drive for reading from and writing to a removable, non-volatile magnetic disk (e.g., a "floppy disk"), and/or an optical disk drive for reading from and/or writing to a removable, non-volatile optical disk such as a compact disk (CD), digital versatile disk (DVD), or other optical media. The mass storage devices 225 may further include other types of computer-readable media, such as magnetic cassettes or other magnetic storage devices, flash memory cards, electrically erasable programmable read-only memory (EEPROM), or the like. Generally, the mass storage devices 225 provide for non-volatile storage of computer-readable instructions, data structures, program modules, code segments, and other data for use by the computing device 210. For instance, the mass storage device 225 may store an operating system 265, one or more applications 270, and other code and data 275.

The system memory 230 may include both volatile and non-volatile media, such as random access memory (RAM) 280, and read only memory (ROM) 285. The ROM 285 typically includes a basic input/output system (BIOS) 290 that contains routines that help to transfer information between elements within the computing device 210, such as during startup. The BIOS 290 instructions executed by the processor 220, for instance, causes the operating system 265 to be loaded from a mass storage device 225 into the RAM 280. The BIOS 290 then causes the processor 220 to begin executing the operating system 265' from the RAM 280. One or more applications 270 may then be loaded into the RAM 280 under control of the operating system 265'.

The operating system 265' includes the system manager 110 that provides the means to manage and monitor the health of the system 200. The system manager 110 may be called by an application 270' running locally on the computing device 210 or remotely by an application running on another computing device 215. Referring again to FIG. 1, the system manager 110 includes an application program interface 125, a providers manager 130, one or more loadable instantiations of providers 135-140 and storage for the management data 145. The one or more loadable instantiations of providers 135-140 collectively form a provider subsystem 150. A particular provider instantiation 145 is a loadable software component utilized to expose a particular managed object 120, such as a service. In one implementation, the system manager 110 is a Windows Management Instrumentation (WMI) component and the providers manager 130 is a Common Information Model Object Manager (CIMOM). A given provider 135 functions as a mediator between the CIM Object Manager 130 and a given managed objects (e.g., system components) 120. Providers 135 supply the CIM Object Manager with data from managed objects 120, handle request on behalf of managed application, and generate event notifications. Accordingly, the WMI subsystem 110 enables management capabilities by supplying a standard storage component (e.g., CIM), the means to set and get information to and from storage 145, and the ability to dock third-party providers to the CIM Object Manager 130.

Based upon the state of the one or more API level flags 155, the providers manager 130 loads a particular provider instantiation 135. In one implementation, the API level flags 155 include a provider architecture flag 160 and a required architecture flag 165. The provider architecture flag 160 can be a small integer value that specifies a 32-bit or 64-bit provider version that the calling application 115 would like to invoke regardless of the callers bitness. In particular, the provider architecture flag 160 may be set to a first value (e.g., 32) to indicate that a calling application is interested in invoking a 32-bit version of a provider instantiation, or the provider architecture flag 160 may be set to a second value (e.g., 64) to indicate that the calling application is interested in invoking a 64-bit version of the provider. Accordingly, the provider architecture flag 160 may be utilized to provide side-by-side handling of 32-bit and 64-bit providers on 64-bit host platforms.

The required architecture flag 165 can be a Boolean value that may be utilized to force the provider architecture, requested in the provider architecture flag 160, to be loaded. More specifically, the requested architecture indicated by the state of the provider architecture flag 160 is loaded if available, when the required architecture flag 165 is set to a first state (e.g., true). If the required architecture flag 165 is set to the first state and the requested architecture indicated by the state of the provider architecture flag 160 is not available, an indication that the requested architecture failed to load is returned. If the required architecture flag 160 is set to a second state (e.g., false), the requested architecture indicated by the state of the provider architecture flag 165 is loaded if available, otherwise a default architecture (e.g., 64-bit version of a provider instantiation) is loaded.

Optionally, if the required architecture flag 165 is set to the second state and the requested architecture indicated by the state of the provider architecture flag 160 is not available, a particular version of a provider may be loaded based upon an observed bitness of the calling application. For example, if the default provider instantiation is a 64-bit version but the bitness of the caller is a 32-bit environment, a 32-bit version of the provider may be loaded if the required architecture flag 165 is set to the second state.

Figure 3:
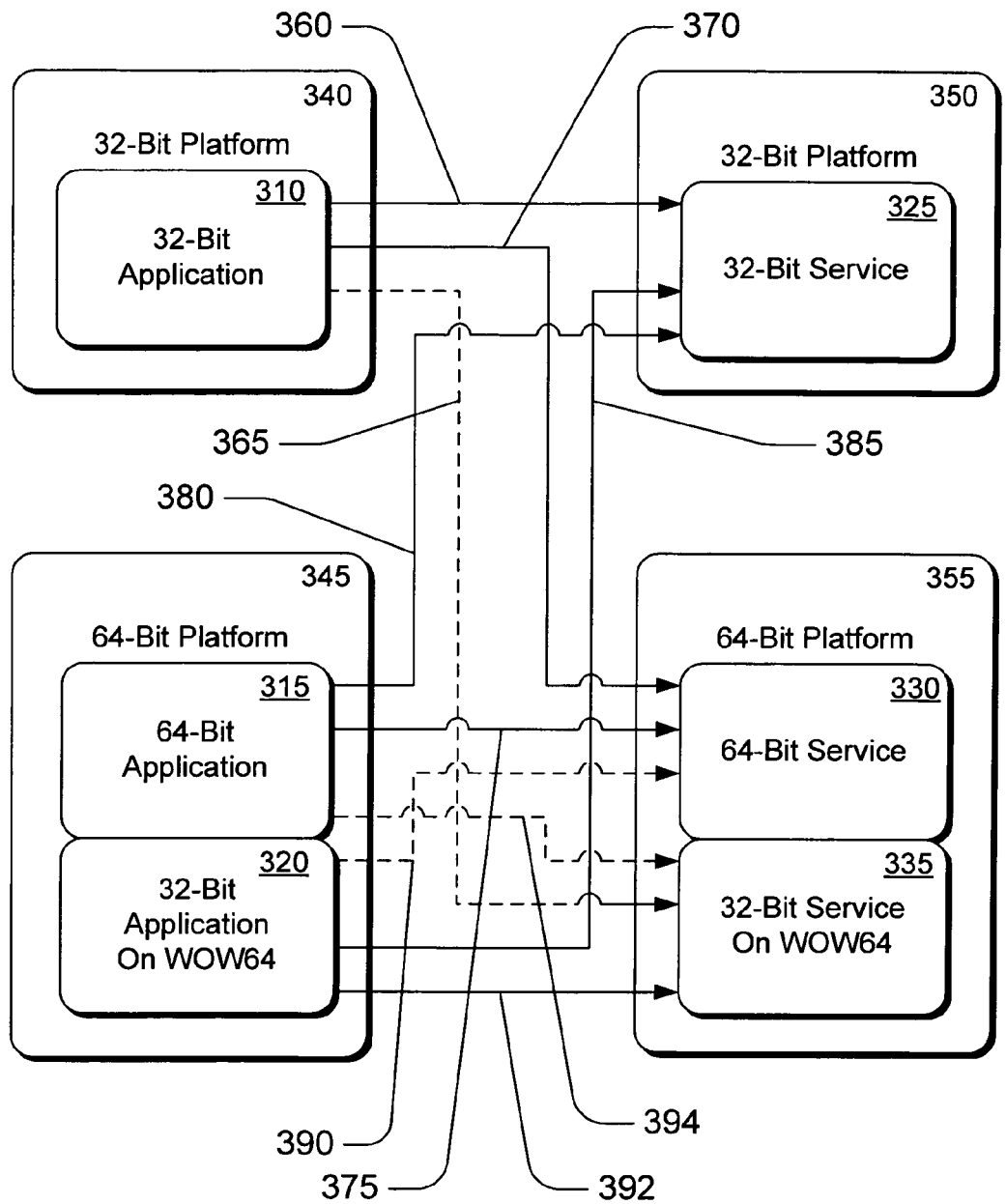
FIG. 3 shows a block diagram of various provider handling scenarios.

By way of illustration, consider the exemplary provider handling scenarios shown in FIG. 3. The various provider handling scenarios illustrate possible permutations of a calling application 310-320 trying to access a service, such as a registry 325-335 via registry providers 350-385, in both local and remote cases. In a first scenario, a 32-bit application 310 running locally on a 32-bit platform 340 invokes a registry service, without the provider architecture and required architecture flags set. On a 32-bit host platform 350, a 32-bit registry provider instantiation 360 handles the request by default. On a 64-bit host platform 355, a WOW64 (e.g., a 64-bit version of Windows emulating a 32-bit version of Windows) registry provider instantiation 392 handles the request by default. The bitness of the calling application 310 is observed to determine that the WOW64 version of the registry provider 365 should be invoked.

In a second scenario, a remote 32-bit application 310 invokes the registry service, with no flags set. On a 32-bit host platform 350, a 32-bit registry provider instantiation 360 handles the remote request by default. On a 64-bit host platform 355, a 64-bit registry provider instantiation 370 handles the request by default.

In a third scenario, a local 32-bit application 310 invokes the registry service. The provider architecture flag indicates that a 32-bit version of the registry service is desired. On a 32-bit host platform 360, a 32-bit registry provider instantiation 350 handles the request. On a 64-bit host platform 355, a WOW64 registry provider instantiation 392 handles the request. Accordingly, the calling application 310 may cross-invoke a 64-bit version of the registry service 335 utilizing the provider architecture flag.

In a fourth scenario, a remote 32-bit application 310 invokes the registry service. The provider architecture flag indicates that a 32-bit version of the registry service is desired. On a 32-bit host platform 360, a 32-bit registry provider instantiation 350 handles the remote request. On a 64-bit host platform 355, the WOW64 registry provider 365 instantiation handles the request. Accordingly, the calling application 310 may cross-invoke a 64-bit version of the registry provider 360 utilizing the provider architecture flag.

In a fifth scenario, a local 64-bit application 315 invokes the registry service with no flags set. For the 32-bit platform 350, it is appreciated that a 64-bit application cannot run locally. On a 64-bit platform 355, the 64-bit registry provider instantiation 375 handles the request by default.

In a sixth scenario, a remote 64-bit application 315 invokes the registry service with no flags set. On the 32-bit platform 350, the 32-bit registry provider instantiation 380 may handle the remote request or an error may be returned. On the 64-bit platform 355, the 64-bit registry provider instantiation 375 handles the request by default.

In a seventh scenario, a local 64-bit application 315 invokes the registry service. The provider architecture flag indicates that a 64-bit version of the registry service is desired. For the 32-bit platform 350, the 64-bit application cannot run locally. On the 64-bit platform 355, the 64-bit registry provider instantiation 375 handles the request by default 265.

In an eighth scenario, a remote 64-bit application 315 invokes the registry service. The provider architecture flag indicates that a 64-bit version of the registry service is desired. On the 32-bit platform 350, the 32-bit registry provider instantiation 380 may handle the remote request or an error may be returned. It is appreciated that the conventional 32-bit Windows Management Instrumentation infrastructure will ignore the flags. On the 64-bit platform 355, the 64-bit registry provider instantiation 375 handles the request.

In a ninth scenario, a local 32-bit application 320 running on a 64-bit platform 345 invokes the registry service. The provider architecture flag indicates that a 64-bit version of the registry provider is desired. On the 32-bit machine 350, the 32-bit registry provider instantiation 385 may handle the local request or an error may be returned. It is appreciated that the conventional 32-bit Windows Management Instrumentation infrastructure will ignore the flags. On the 64-bit platform 355, the 64-bit registry provider instantiation 390 handles the request.

In a tenth scenario, a remote 32-bit application 320 running on a 64-bit platform 345 invokes the registry service. The provider architecture flag indicates that a 64-bit version of the registry service is desired. On the 32-bit platform 350, the 32-bit registry provider instantiation 385 may handle the remote request or an error may be returned. It is appreciated that the conventional 32-bit Windows Management Instrumentation infrastructure will ignore the flags. On the 64-bit platform 355, the 64-bit registry provider instantiation 390 handles the request. Accordingly, the calling application 320 may cross-invoke a 64-bit version of the registry service 330 utilizing the provider architecture flag.

In an eleventh scenario, a local 64-bit application 315 invokes the registry service. The provider architecture flag indicates that a 32-bit version of the registry service is desired. For the 32-bit platform 350, the 64 bit application cannot run locally. On the 64-bit platform 355, a WOW64 registry provider instantiation 394 handles the request.

In a twelfth scenario, a remote 64-bit application 315 invokes the registry service. The provider architecture flag indicates that a 32-bit version of the registry service is desired. For the 32-bit platform 350, the 32-bit registry provider instantiation 380 handles the request. On the 64-bit platform 355, the 32-bit registry provider instantiation 394 handles the request.

Figure 4:
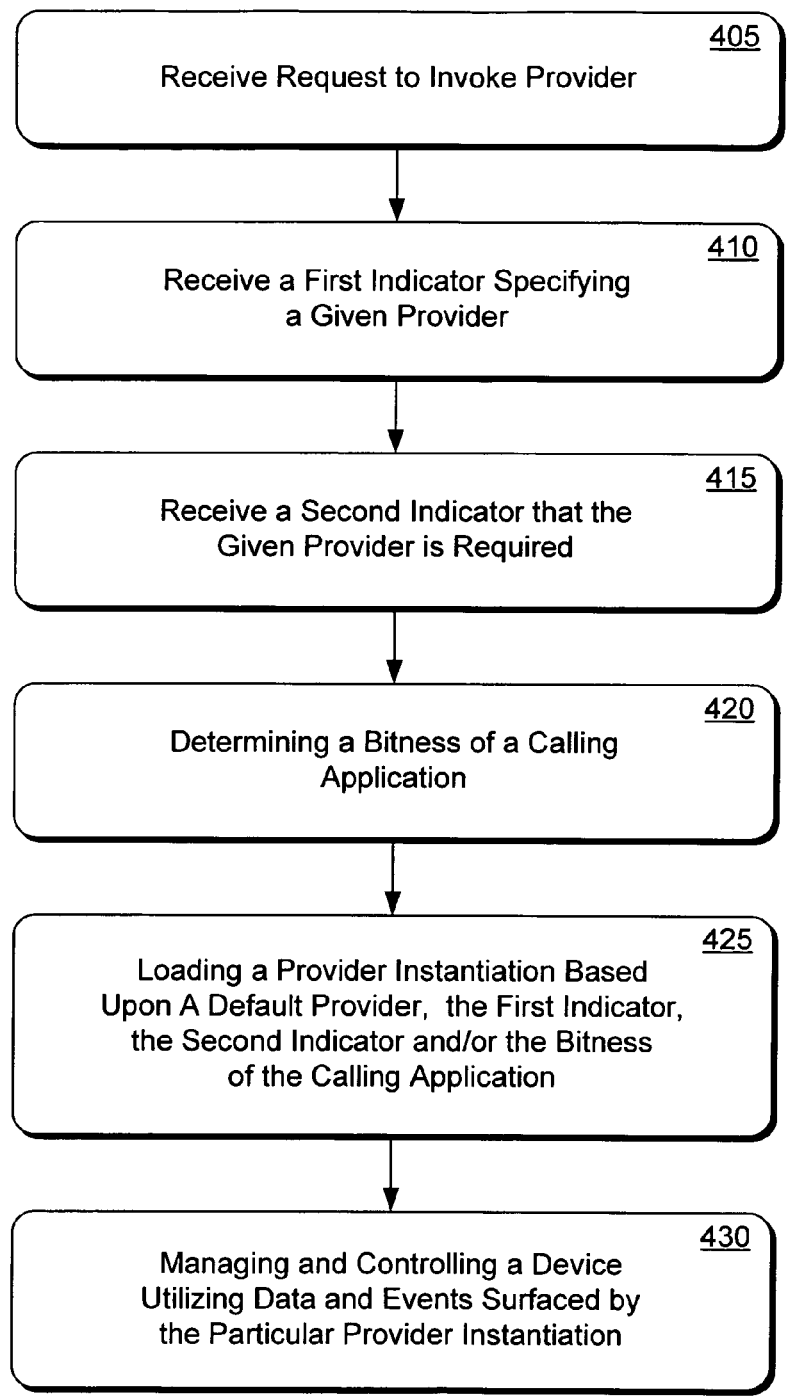
FIG. 4 shows a flow diagram of a platform management method for handling providers.

The technique for handling providers is further described with reference to the method shown in FIG. 4. The method of handling providers 400 may be implemented by some or all of the functional elements of the system 100 and/or various combinations of the functional elements. However, the method 400 may be implemented independently of the system 100. Likewise, the system 100 for handling providers may be implemented independently of the illustrated method 400.

In accordance with the method 400, a request to invoke a provider is received by a provider subsystem on the server side, at 405. In one implementation, the provider subsystem is the Windows Management Instrumentation (WMI) component. At optional process 410, a first indication that a caller is interested in invoking a 32bit or 64-bit version of the provider is received by the provider subsystem. In one implementation, the first indication is a provider architecture flag that is a small integer value of either 32 or 64 for specifying a 32 or 64 bit instantiation of the provider to be invoked. At optional process 415, a second indication that the requested version is required is received by the provider subsystem. In one implementation, the second indication is a required architecture flag that is a Boolean value of either 'true' or 'false' for forcing the specific version of the provider. In one instance of process 405-415, the provider subsystem inspects two flags to decide the appropriate version of a provider to load in response to a request.

At optional process 420, a bitness of the calling application is observed by the provider subsystem. Thus, the request for a version of the provider need not be made explicitly via the flags. In such cases, the provider subsystem will make an appropriate determination based on the caller's architecture bitness.

At 425, a provider instantiation is loaded by the provider subsystem. Providers are dynamic linked lists (DLLs) or executables (EXEs) that render a layer of abstraction between a managed object and the provider subsystem infrastructure. Instantiations of providers hide the implementation details that are unique to a given management methodology or protocol (e.g., Application Programming Interface (API), Windows Driver Model (WDM), Simple Network Management Protocol (SNMP), Desktop Management Interface (DMI), and the like). The particular provider instantiation may be selected as a function of the first indicator. The particular provider instantiation may further be selected as a function of the second indicator. If a first indicator is not received, a default instantiation of the provider is invoked. Alternatively, if the first indicator is not received but a bitness of the calling application is observed, the particular provider instantiation may be selected as a function of the observed bitness.

Utilizing the first indicator the provider subsystem may be configured to cross invoke a non-default provider. Cross invoking a non-default provider, for example, allows access for side-by-side handling of 32-bit and 64-bit providers on a 64-bit host. Furthermore, the invoking of a particular provider may be forced utilizing the second indicator.

Thereafter, the provider subsystem enables the calling application to mine data, subscribe to events, or perform other management-related tasks, at 430. The provider subsystem retrieved data in real time from native repositories such as AD (e.g., ntds.dit), event logs (.evt files), registry hives, and Win32 or Win64 APIs. The provider subsystem also provides asynchronous notification about the changes occurring in the managed system. Accordingly, the provider subsystem enables devices and systems in a network to be managed and controlled.

Generally, any of the systems and methods for implementing platform management techniques for handling providers, as described above, can be implemented using software, firmware, hardware, or any combination of these implementations. The term "logic, "module" or "functionality" as used herein generally represents software, firmware, hardware, or any combination thereof. For instance, in the case of a software implementation, the term "logic," "module," or "functionality" represents computer-executable program code and data that performs specified tasks when executed on a computing device or devices. For instance, a processor of the computing device executes various instructions and acts upon data encoded in one or more computer-readable media (e.g., computer memory). The program code can be stored in one or more computer-readable media (e.g., computer memory). It is also appreciated that the illustrated separation of logic, modules and functionality into distinct units may reflect an actual physical grouping and allocation of such software, firmware and/or hardware, or can correspond to a conceptual allocation of different tasks performed by a single software program, firmware routine or hardware unit. The illustrated logic, modules and functionality can be located at a single site, or can be distributed over a plurality of locations.

Although techniques for application handling in a system management component have been described in language specific to structural features and/or methods, it is to be understood that the subject of the appended claims is not necessarily limited to the specific features or methods described. Rather, the specific features and methods are disclosed as exemplary implementations of techniques for handling providers in a platform management component.

What is claimed is:

1. A platform management method for handling providers comprising:
    receiving, by a provider subsystem, a request to invoke a provider on a server, wherein the provider is a dynamic linked list or an executable that renders a layer of abstraction between a managed object and the provider subsystem and the provider is used to surface instrumented data and events for a particular managed entity on a system requested by a calling device, wherein the particular managed entity is compiled to a specific platform architecture;
    receiving a first indicator specifying a 32-bit or 64-bit version of the provider that the calling device desires to invoke;
    receiving a second indicator comprising a state identifying whether a version specified by the first indicator is required, wherein when the state is a first state, the version specified by the first indicator is required, and when the state is a second state, the version specified by the first indicator is not required;
    inspecting the first indicator and the second indicator to determine the version of the provider to load in response to the request;
    observing a bitness of a calling application on the calling device; and
    loading a particular provider instantiation corresponding to the version as specified by the first indicator and the second indicator, enabling the calling device to manage and to control the particular managed entity, wherein when the first indicator specifies the version having a different bitness from the calling application on the calling device and the second indicator identifies the version specified by the first indicator is required, then the particular provider instantiation that is loaded corresponds to a bitness of the version specified by the first indicator.

2. A platform management method for handling providers according to claim 1, wherein the first indicator comprises a small integer value for specifying the 32-bit or 64-bit version of the provider.

3. A platform management method for handling providers according to claim 1, further comprising loading a default provider instantiation when the second indicator identifies the version specified by the first indicator is not required.

4. A platform management method for handling providers according to claim 1, further comprising loading a provider instantiation according to the bitness of a calling application when the second indicator identifies the version specified by the first indicator is not required.

5. A platform management method for handling providers according to claim 1, wherein the second indicator comprises a Boolean value for forcing the loading of the particular provider instantiation corresponding to the version as specified by the first indicator.

6. A platform management method for handling providers according to claim 1, further comprising returning an indication that the particular provider instantiation failed to load when the second indicator identifies the version specified by the first indicator is required and the version specified by the first indicator is not available on the server.

7. A platform management method for handling providers according to claim 1, further comprising loading the particular provider instantiation corresponding to the version as specified by the first indicator when the version is available and the second indicator identifies the version specified by the first indicator is not required, or loading a default provider instantiation when the version specified by the first indicator is not available and the second indicator identifies the version specified by the first indicator is not required.

8. A platform management method for handling providers according to claim 1, further comprising:
    receiving a first request to invoke a first provider on the server from a 32-bit calling application on a 32-bit calling device, wherein the first indicator received corresponding to the first request specifies the 32-bit version of the first provider is desired;
    responsive to the first request, loading the 32-bit version of the first provider when the server is a 32-bit host platform or loading a compatibility mode version of the first provider when the server is a 64-bit host platform, wherein the compatibility mode comprises at least WOW64 mode;
    receiving a second request to invoke a second provider on the server from a 64-bit calling application on a 64-bit calling device, wherein the first indicator received corresponding to the second request specifies the 32-bit version of the second provider is desired;
    responsive to the second request, loading the 32-bit version of the second provider when the server is the 32-bit host platform or loading the compatibility mode version of the second provider when the server is the 64-bit host platform;
    receiving a third request to invoke a third provider on the server from the 64-bit calling application on the 64-bit calling device, wherein the first indicator received corresponding to the third request specifies the 64-bit version of the third provider is desired;
    responsive to the third request, loading the 32-bit version of the third provider or returning an error when the server is the 32-bit host platform or loading the 64-bit version of the third provider when the server is the 64-bit host platform;

receiving a fourth request to invoke a fourth provider on the server from another 32-bit calling application on the 64-bit calling device, wherein the first indicator received corresponding to the fourth request specifies the 64-bit version of the fourth provider is desired; and responsive to the fourth request, loading the 32-bit version of the fourth provider or returning the error when the server is the 32-bit host platform or loading the 64-bit version of the fourth provider when the server is the 64-bit host platform.

9. An apparatus comprising:

a processor; and a memory communicatively coupled to the processor;

wherein the apparatus is adapted to:

provide a windows management instrumentation component comprising a provider subsystem configured to:

receive from a calling application a request to invoke a provider and a first indicator specifying a desired 32-bit or 64-bit version of the provider to be invoked, wherein the first indicator is a state of a provider architecture flag; and receive from the calling application a second indicator comprising a state identifying whether the version specified by the first indicator is required, wherein when the state is a first state, the version specified by the first indicator is required, and when the state is a second state, the version specified by the first indicator is not required;

inspecting the first indicator and the second indicator to determine the version of the provider to load in response to the request;

observing a bitness of the calling application on a calling device; and invoke a particular version of a plurality of providers of the windows management instrumentation component based on the state of the first indicator and the second indicator, wherein when the first indicator specifies the version of the provider has a different bitness from the calling application and the second indicator identifies the version specified by the first indicator is required, then a particular provider instantiation that is loaded corresponds to a bitness of the desired version specified by the first indicator; and surface platform data and events from a managed object to the calling application according to the particular provider to allow for a side-by-side handling of the one of the plurality of providers of the windows management instrumentation component, wherein the provider is a dynamic linked list or an executable that renders a layer of abstraction between the managed object and the provider subsystem.

10. An apparatus according to claim 9, wherein the apparatus is further adapted to invoke the particular version of the plurality of the providers or return an error when a required architecture flag is set to a first state.

11. An apparatus according to claim 10, wherein the apparatus is further adapted to invoke the particular version of the providers or invoke a default provider if the particular one of the providers is not available when the required architecture flag is set to a second state.

12. An apparatus according to claim 9, wherein the apparatus is further adapted to:

determine a bitness of the client application when the second indicator identifies the version specified by the first indicator is not required; and setting the state of the provider architecture flag according to the bitness.

13. An apparatus according to claim 9, wherein a state of the provider architecture flag is set to surface a 32-bit version of the management object on a 64-bit platform.

14. One or more computer-readable storage media having instructions that, when executed on one or more processors, perform acts comprising:

receiving a request to invoke a provider on a 64-bit system, wherein the provider is used to surface instrumented data and events for a particular managed entity on a system requested by a calling device, the particular managed entity is compiled to a specific platform architecture;

receiving a provider architecture flag as a first indicator from the calling device specifying a 32-bit or 64-bit version of the provider to be invoked as desired by the calling device;

receiving a second indicator comprising a state identifying whether a version specified by the first indicator is required;

inspecting the first indicator and the second indicator to determine the version of the provider to load in response to the request;

loading a particular provider instantiation as specified by the provider architecture flag and the second indicator, wherein when the provider architecture flag specifies a version of the provider has a different bitness from the calling device and the second indicator identifies the version specified by the first indicator is required, then the particular provider instantiation that is loaded corresponds to a bitness of the version specified in the provider architecture flag; and surfacing platform data and events utilizing the particular provider instantiation allowing for a side-by-side handling of providers.

15. One or more computer-readable storage media according to claim 14, wherein:

the request is received by a host server;

the provider architecture flag is received by the host server; and the particular provider instantiation is loaded by the host server.

16. One or more computer-readable storage media according to claim 14, further comprising:

determine a bitness of a calling application when the second indicator identifies the version specified by the first indicator is not required; and setting the state of the provider architecture flag according to the bitness.

17. One or more computer-readable storage media according to claim 16, wherein:

the bitness is determined by a host server.

18. One or more computer-readable storage media according to claim 14, further comprising loading a default provider instantiation when the second indicator identifies the version specified by the first indicator is not required.

19. One or more computer-readable storage media according to claim 14, further comprising:

receiving a required architecture flag specifying that the given instantiation of the provider is required; and loading the particular provider instantiation or returning an error indicator when the required architecture flag is set to a first state.

20. One or more computer-readable storage media according to claim 19, further comprising loading the particular provider instantiation if available or loading a default provider instantiation if the given provider instantiation is not available when the required architecture flag is set to a second state.

* * * * *